(12) United States Patent
Benn

(10) Patent No.: US 11,552,583 B2
(45) Date of Patent: Jan. 10, 2023

(54) DRIVE SYSTEM

(71) Applicant: Hamilton Sundstrand Corporation, Charlotte, NC (US)

(72) Inventor: Andrew J. Benn, Birmingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 42 days.

(21) Appl. No.: 17/144,485

(22) Filed: Jan. 8, 2021

(65) Prior Publication Data
US 2021/0320599 A1 Oct. 14, 2021

(30) Foreign Application Priority Data
Apr. 8, 2020 (EP) ..................................... 20275075

(51) Int. Cl.
| | |
|---|---|
| *H02P 1/00* | (2006.01) |
| *H02P 7/292* | (2016.01) |
| *B60L 50/60* | (2019.01) |
| *B60L 53/62* | (2019.01) |
| *B60L 53/24* | (2019.01) |

(Continued)

(52) U.S. Cl.
CPC .............. *H02P 7/292* (2013.01); *B60L 15/20* (2013.01); *B60L 50/60* (2019.02); *B60L 53/24* (2019.02); *B60L 53/62* (2019.02); *B60L 58/10* (2019.02); *B64D 27/24* (2013.01); *B64D 31/00* (2013.01); *H02P 3/14* (2013.01); *B60L 2200/10* (2013.01); *B60L 2210/10* (2013.01)

(58) Field of Classification Search
CPC .. H02P 7/292; H02P 3/14; B60L 50/60; B60L 53/62; B60L 53/24; B60L 58/10; B60L 15/20; B60L 2200/10; B64D 27/24; B64D 31/00
See application file for complete search history.

(56) References Cited

U.S. PATENT DOCUMENTS

| | | |
|---|---|---|
| 5,161,097 A | 11/1992 | Ideda |
| 5,914,542 A | 6/1999 | Weimer et al. |

(Continued)

FOREIGN PATENT DOCUMENTS

WO 2017211418 A1 12/2017

OTHER PUBLICATIONS

European Search Report for International Application No. 20275075.8 dated Jul. 28, 2020, 31 pages.

(Continued)

*Primary Examiner* — Karen Masih
(74) *Attorney, Agent, or Firm* — Cantor Colburn LLP

(57) ABSTRACT

A drive system comprises a DC-DC converter that is arranged to receive an input voltage from a battery having a nominal battery voltage. The DC-DC converter has a first mode of operation in which the DC-DC converter generates a regulated output voltage from the input voltage and supplies the regulated output voltage to a load, and a second mode of operation in which the DC-DC converter is by-passed such that the input voltage from the battery is supplied to the load. A controller is arranged to compare the input voltage to a threshold voltage that is less than the nominal battery voltage. The controller operates the DC-DC converter in the first mode when the input voltage is less than the threshold voltage, and operates the DC-DC converter otherwise.

17 Claims, 6 Drawing Sheets

(51) Int. Cl.
*B60L 58/10* (2019.01)
*B60L 15/20* (2006.01)
*B64D 27/24* (2006.01)
*B64D 31/00* (2006.01)
*H02P 3/14* (2006.01)

(56) References Cited

U.S. PATENT DOCUMENTS

| | | |
|---|---|---|
| 7,701,082 B2 | 4/2010 | Lazarovich et al. |
| 9,013,066 B2 | 4/2015 | Kojori et al. |
| 10,153,693 B2 | 11/2018 | Wilhide |
| 10,479,218 B2 | 11/2019 | Lee et al. |
| 2012/0319612 A1 | 12/2012 | Weil et al. |
| 2013/0134776 A1 | 5/2013 | Luecken et al. |
| 2019/0359064 A1 | 11/2019 | Wilhide et al. |
| 2020/0290742 A1* | 9/2020 | Kumar .................. B64D 27/24 |

OTHER PUBLICATIONS

Grumm Florian et al., "Robust Primary Protection Device for Weight-Optimized PEM Fuel Cell Systems in High-Voltage DC Power Systems of Aircraft", IEEE Transactions on Industrial Electronics,USA, vol. 66, No. 7, Jul. 1, 2019, 11 pages.
Lucken Arno et al., "Fuel Cell System Optimizaiton Using Bypass Converters", IEEE Transactions on Aerospace and Electronic Systems., vol. 50, No. 1, Jan. 1, 2014, 10 pages.

* cited by examiner

| Parameter | Prior Art | Disclosed System |
|---|---|---|
| Vdc range (V) | 480-870 | 870 |
| Shaft output power (kW) | 53.5 | 53.5 |
| Motor torque constant (Nm/A) | 0.084 | 0.102 |
| Torque (Nm) | 25.6 | 25.6 |
| Phase current ($A_{pk}$) | 320 | 210 |
| Inverter loss with 870Vdc supply (kW) | 1.4 | 0.9 |
| Worst case DC supply current (A) | 113.8 (at 470Vdc) | 66.9 (at 800 Vdc) |
| Minimum supply cable cross-sectional area ($mm^2$) | 26 | 13 |

Fig. 4

DRIVE SYSTEM

FOREIGN PRIORITY

This application claims priority to European Patent Application No. 20275075.8 filed Apr. 8, 2020, the entire contents of which is incorporated herein by reference.

TECHNICAL FIELD

This disclosure relates to a drive system including a DC-DC converter, and particularly to a DC-DC converter suitable for use in e.g. battery-powered electric propulsion systems such as those used in battery-powered aircraft.

BACKGROUND ART

In the aerospace industry, there has been a recent increase of interest in electric propulsion systems, e.g. to provide fully-electric aircraft such as battery-powered aircraft. One important consideration particularly relevant to electric aircraft is the power to weight density.

In some conventional electric propulsion systems for aircraft, known in the art per se, the output voltage from the battery typically drops as the battery discharges. This drop in voltage may, in some cases, be as much as 45%. For example, a battery with a nominal voltage rating of 870 Vdc may drop as low as 480 Vdc.

This drop in battery voltage may be detrimental to the aircraft's motor design. Specifically, the motor and associated distribution system must be designed for the lowest system voltage (i.e. 480 Vdc as outlined above). Compromises made to the design to allow operability across the full output voltage range of the battery can have negative impacts of the performance of the system. For example, designing the motor and distribution system to accommodate the drop in battery output voltage may lead to higher system losses.

Specifically, a lower battery output voltage results in a larger current being drawn, where greater losses are associated with a larger current. Moreover, the wiring harness of the distribution system must be scaled to handle the larger current associated with the lower battery output voltage, resulting in the use of cables having a greater cross-sectional area, therefore adding to the weight and volume of the system which is undesirable for aerospace applications, especially electric-powered aircraft.

SUMMARY OF THE DISCLOSURE

In accordance with a first aspect, the present disclosure provides a drive system comprising: a DC-DC converter arranged to receive an input voltage from a battery arranged to supply a nominal battery voltage, said DC-DC converter having a first mode of operation in which the DC-DC converter generates a regulated output voltage from the input voltage and supplies said regulated output voltage to a load, and a second mode of operation in which the DC-DC converter is by-passed such that the input voltage from the battery is supplied to the load; and a controller arranged to compare the input voltage to a threshold voltage, said threshold voltage being less than the nominal battery voltage, wherein the controller is further arranged to operate the DC-DC converter in the first mode when the input voltage is less than the threshold voltage, and to operate the DC-DC converter in the second mode when the input voltage is not less than the threshold voltage.

This first aspect of the present disclosure extends to a motor drive system comprising a motor and a battery arranged to supply a nominal battery voltage, the motor drive system further comprising: a DC-DC converter arranged to receive an input voltage from the battery, said DC-DC converter having a first mode of operation in which the DC-DC converter generates a regulated output voltage from the input voltage and supplies said regulated output voltage to the motor, and a second mode of operation in which the DC-DC converter is by-passed such that the input voltage from the battery is supplied to the motor; and a controller arranged to compare the input voltage to a threshold voltage, said threshold voltage being less than the nominal battery voltage, wherein the controller is further arranged to operate the DC-DC converter in the first mode when the input voltage is less than the threshold voltage, and to operate the DC-DC converter in the second mode when the input voltage is not less than the threshold voltage.

This first aspect of the present disclosure also extends to an aircraft comprising a motor and a battery arranged to supply a nominal battery voltage, the aircraft further comprising a motor drive system comprising: a DC-DC converter arranged to receive an input voltage from the battery, said DC-DC converter having a first mode of operation in which the DC-DC converter generates a regulated output voltage from the input voltage and supplies said regulated output voltage to the motor, and a second mode of operation in which the DC-DC converter is by-passed such that the input voltage from the battery is supplied to the motor; and a controller arranged to compare the input voltage to a threshold voltage, said threshold voltage being less than the nominal battery voltage, wherein the controller is further arranged to operate the DC-DC converter in the first mode when the input voltage is less than the threshold voltage, and to operate the DC-DC converter in the second mode when the input voltage is not less than the threshold voltage.

This first aspect of the present disclosure extends to a method of operating a drive system, the method comprising: receiving an input voltage from a battery arranged to supply a nominal battery voltage; comparing the input voltage to a threshold voltage, said threshold voltage being less than the nominal battery voltage; when the input voltage is less than the threshold voltage, generating a regulated output voltage from the input voltage and supplying said regulated output voltage to a load; and when the input voltage is not less than the threshold voltage, supplying the input voltage from the battery to the load.

Thus it will be appreciated that examples of the present disclosure overcome the issues outlined above by providing a DC-DC converter than can be selectively enabled depending on the current voltage level of the battery. Those skilled in the art will appreciate that in conventional drive systems (e.g. those used in electric propulsion applications), no DC-DC converter is generally supplied and the battery may be connected directly to the load. There are a number of loads that may be driven by a drive system in accordance with this disclosure, however in at least some preferred examples, the load is a motor. Such a motor may, in some examples, be coupled to an actuator.

Generally speaking, conventional approaches to drive design eschew the use of DC-DC converters wherever possible so as to save on weight and volume, which are important considerations, particularly in aerospace applications such as in aircraft. Those skilled in the art will appreciate that the term 'aircraft' as used herein extends to any vehicle that can fly, including but not limited to airplanes, helicopters, airships, blimps, and powered gliders.

Contrary to this perceived 'conventional wisdom', the present disclosure counterintuitively adds a DC-DC converter that would not normally be required in order for proper function of the drive system, i.e. in order for the battery to drive the load. As outlined above, this DC-DC converter results in a trade-off in weight and physical volume associated with the drive system, however it provides a significant advantage in that the rest of the system, in particular the load (e.g. motor) can be designed for a far narrower voltage range, i.e. the range between the nominal voltage of the battery and the threshold voltage. As the DC-DC converter acts to prevent the input voltage supplied to the load dropping below the threshold voltage, the load must only be arranged to 'handle' voltages between the threshold and the nominal voltage of the battery.

By keeping the input voltage supplied to the load between the threshold voltage and the nominal voltage of the battery, the maximum current supplied to the load can be significantly lower than that expected of a conventional drive system. By reducing the current supplied to the load (e.g. the phase currents supplied to a motor load), the associated power losses are also reduced compared to a conventional system. Moreover, the reduced maximum current allows for use of electrical cables (i.e. conductors) having smaller cross-sectional area, thus providing weight and volume savings with respect to the cable harnessing, also helping to negate the weight and volume required by the DC-DC converter itself. When the input voltage is within the designed range, the DC-DC converter is effectively 'transparent' as the controller acts to bypass the DC-DC converter, allowing for direct driving of the load by the battery, thereby helping to optimise overall system efficiency, and potentially preventing (or at least reducing) any losses associated with the DC-DC converter itself.

In some examples, the DC-DC converter has a third mode of operation in which the DC-DC converter generates a charging voltage from a load voltage received from the load and supplies said charging voltage to the battery. The DC-DC converter may, in accordance with such examples, be bidirectional, thereby allowing 'reverse' currents to charge the battery, this avoids the need for separate hardware to provide battery charging using energy recovered from the load, thereby also helping to negate the weight and volume trade-off outlined above. Thus the method outlined hereinabove may further comprise generating a charging voltage from a load voltage received from the load and supplying said charging voltage to the battery.

The controller may be separate to the DC-DC converter, however in other examples these may be integrated within the same hardware unit.

As outlined above, the battery will generally have a 'nominal voltage', i.e. the voltage that the battery is 'supposed' to supply according to its design parameters. The nominal voltage of the battery may, in some examples, be between approximately 600 V and 1100 V, optionally between approximately 700 V and 1000 V, further optionally between approximately 800 V and 900 V, and may in some examples be between approximately 850 V and 900 V. In some examples, the nominal voltage of the battery may be approximately 870 V.

The threshold voltage may be selected as appropriate based on the nominal voltage of the battery for use with the system. The threshold voltage may, in some examples, be at least approximately 75% of the nominal voltage of the battery, optionally at least approximately 85% of the nominal voltage of the battery, and further optionally at least approximately 90% of the nominal voltage of the battery. In some examples, the nominal voltage of the battery may be approximately 870 V and the threshold voltage may be approximately 800 V (i.e. approximately 92% of the nominal voltage of the battery).

The load may, in some examples, be a single phase load, however in some alternative examples the load is a multi-phase load, for example a three-phase load such as a three-phase motor. The multi-phase load may comprise electronics, for example a three-phase inverter, to allow three-phase power to be derived from the DC power drawn from the DC bus.

In some applications, there may be multiple loads (some or all of which may comprise motors) arranged to receive power from the battery. In some examples, the DC-DC converter is arranged to supply the regulated output voltage to a plurality of loads in the first mode, and to supply the input voltage from the battery to the plurality of loads in the second mode. Thus a single DC-DC converter may be arranged to drive multiple loads, e.g. motors.

In some potentially overlapping examples, the drive system comprises a second DC-DC converter arranged to receive the input voltage from the battery, said second DC-DC converter having a first mode of operation in which the second DC-DC converter generates a regulated output voltage from the input voltage and supplies said regulated output voltage to a second load, and a second mode of operation in which the second DC-DC converter is by-passed such that the input voltage from the battery is supplied to the second load. In a set of such examples, the DC-DC converter may be bidirectional, and may have a third mode of operation in which the DC-DC converter generates a charging voltage from a load voltage received from the load and supplies said charging voltage to the battery.

Operation of this second DC-DC converter may be controlled by the same controller as the first DC-DC converter which may, in some such examples, apply the same or different threshold voltages for switching the two DC-DC converters between their respective modes of operation. Alternatively, the second DC-DC converter may have its own controller. Thus, in a set of examples, the drive system may further comprise a second controller arranged to compare the input voltage to a second threshold voltage, said second threshold voltage being less than the nominal battery voltage, wherein the second controller is further arranged to operate the second DC-DC converter in the first mode when the input voltage is less than the second threshold voltage, and to operate the second DC-DC converter in the second mode when the input voltage is not less than the second threshold voltage. The second threshold voltage may be the same as the threshold voltage applied by the first controller or it may be different.

In a set of potentially overlapping examples, the drive system may be arranged for connection to a plurality of batteries. Thus, in some examples, the DC-DC converter is arranged to receive a second input voltage from a second battery arranged to supply a second nominal battery voltage, wherein in the first mode of operation, the DC-DC converter generates a regulated output voltage from the first and second input voltages and supplies said regulated output voltage to a load, and wherein in the second mode of operation, the DC-DC converter is by-passed such that the first and second input voltages from the first and second batteries is supplied to the load. The batteries may supply their respective input voltages simultaneously, or the controller may switch between which of the batteries supplies the load at any given time. Each battery may be connected to one or multiple DC-DC converters as outlined above. Each DC-DC converter may have features in accordance with any of the sets of examples disclosed herein, as appropriate; for example, some or all of these DC-DC converter(s) may be bidirectional.

In some examples in which the DC-DC converter is bidirectional, when operated in the third mode, the DC-DC converter may supply the charging voltage to the second battery. Different charging voltages may be applied to each battery as appropriate (e.g. where one battery is charged while another is not charged, or where different battery capacities result in different charging voltages being applied to each).

The controller may compare the input voltages from each battery to the same or different threshold voltages, depending on the tolerances of the loads that are to be driven by the respective battery or batteries, and select the appropriate mode of operation for the corresponding DC-DC converter depending on the result of the comparison. Where multiple batteries are input to a single DC-DC converter, the input voltages from each of the batteries may be combined to a combined input voltage, where the controller may compare the combined input voltage to the threshold voltage.

BRIEF DESCRIPTION OF THE DRAWINGS

Certain examples of the present disclosure will now be described with reference to the accompanying drawings, in which:

FIG. 4 is a table comparing the performance of the prior art drive system of FIG. 1 to the drive system of FIG. 3.

DETAILED DESCRIPTION

Figure 1:
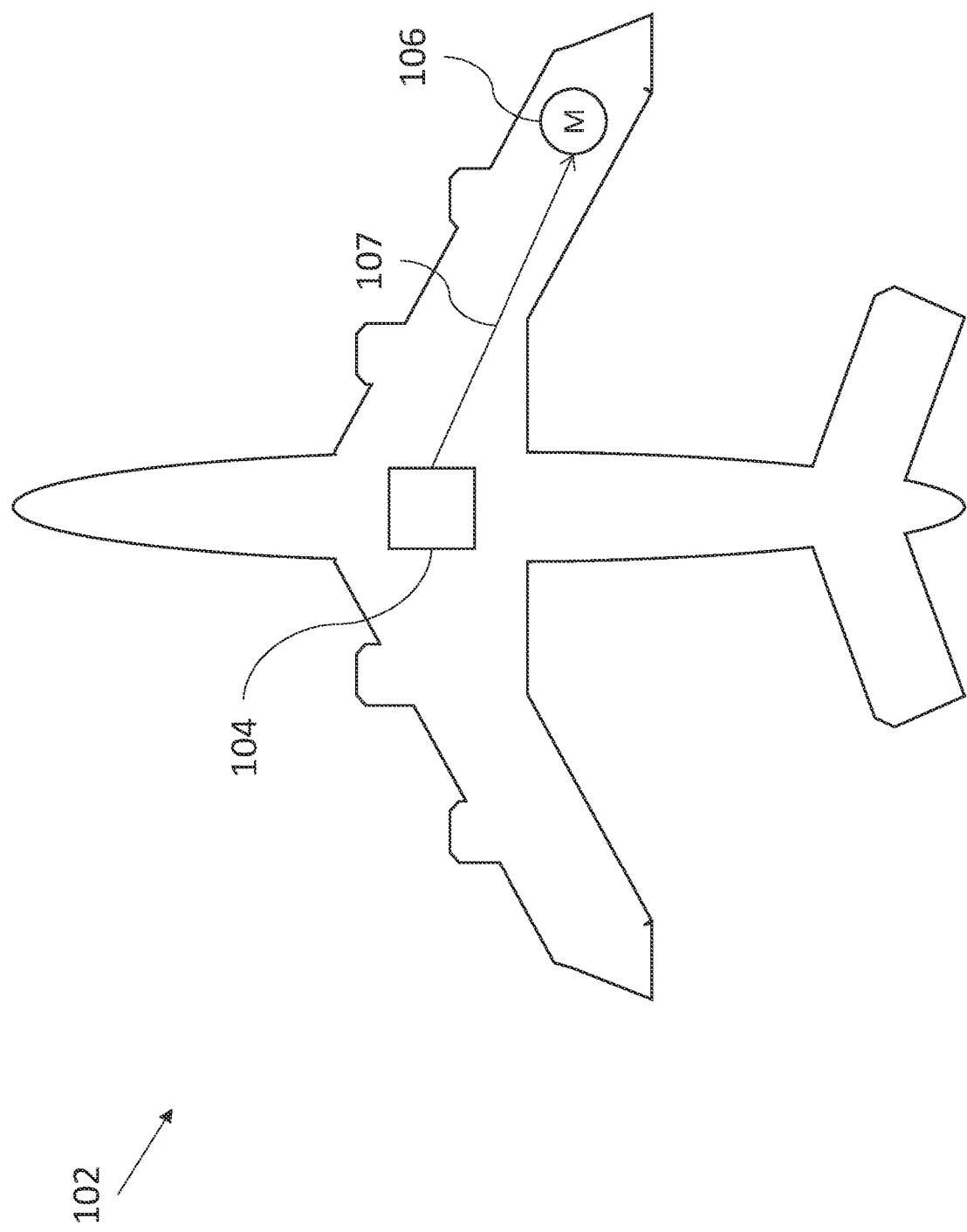
FIG. 1 is a schematic diagram of an aircraft with a prior art drive system.

FIG. 1 is a schematic diagram of an aircraft 102 with a prior art drive system. In this system, a battery 104 is located centrally within the aircraft 102 and is arranged to supply electrical power to a motor 106 via a supply cable 107. It will of course be appreciated that the illustrated aircraft 102 is purely illustrative, and a practical aircraft may have many motors and potentially multiple batteries. The motor 106 includes inverter circuitry, in a manner known in the art per se.

The battery 104 provides a nominal voltage of 870 Vdc, such that the input voltage to the motor 106 is ideally 870 Vdc. However, in use, the voltage supply from the battery 104 will generally drop, and in this example drops as low as 480 Vdc. As can be seen in the comparative table of FIG. 4, this results in a maximum phase current of 320 $A_{pk}$.

In order to handle this large current, the minimum cross-sectional area of the supply cable 107 must be at least 26 $mm^2$. The motor 106 must also be designed to work across the full voltage range, i.e. between 480 Vdc and 870 Vdc, which results in a lower motor torque constant of 0.084 Nm/A, higher inverter loss of 1.4 kW, and higher worst case DC supply current of 113.8 A (when the battery voltage is at the low end of range, i.e. at 470 Vdc) than is possible with examples of the present disclosure as outlined below.

Figure 2:
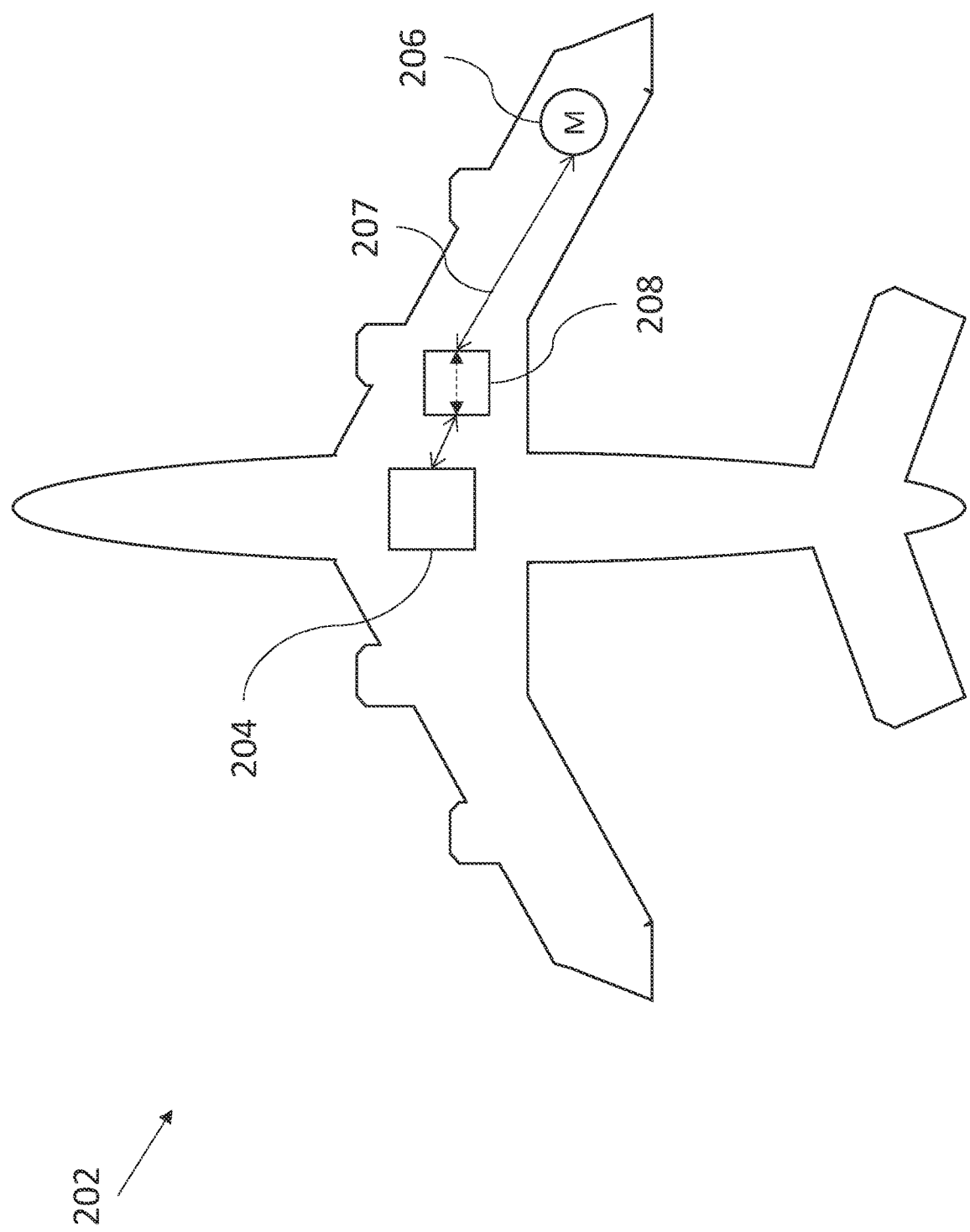
FIG. 2 is a schematic diagram of an aircraft with a drive system in accordance with an example of the present disclosure.

FIG. 2 is a schematic diagram of an aircraft 202 with a drive system in accordance with an example of the present disclosure. Similarly to the system outlined above, a battery 204 is located centrally within the aircraft 202 and is arranged to supply electrical power to a motor 206 via a supply cable 207. In some examples, the aircraft 202 may have many motors and/or batteries, as shown in the more detailed diagram of FIG. 3. The motor 206 includes inverter circuitry, in a manner known in the art per se.

Unlike in the prior art system of FIG. 1, the drive system of FIG. 2 includes a bidirectional DC-DC converter 208. This bidirectional DC-DC converter 208 is arranged to receive the input voltage from the battery 204 at whatever voltage value that the battery 204 is supplying. The bidirectionality of the DC-DC converter 208 allows regenerative energy harnessed from the motor 206 to be used to recharge the battery 204. Those skilled in the art will appreciate that typical prior art systems would require an additional recharging circuit to provide this regenerative 'energy recovery' functionality.

The DC-DC converter 208 has a first mode of operation in which it generates a regulated output voltage from the input voltage from the battery 204, and subsequently delivers the regulated output voltage to the motor 206.

In a second mode of operation, the DC-DC converter 208 is by-passed such that the input voltage from the battery 204 is supplied directly to the motor 206, as outlined by the dashed line across the DC-DC converter 208. In this second mode, the DC-DC converter 208 is passive, i.e. it simply allows current to pass directly through it from the battery 204 to the motor 206, and vice versa in its regenerative mode, as outlined above.

Figure 3:
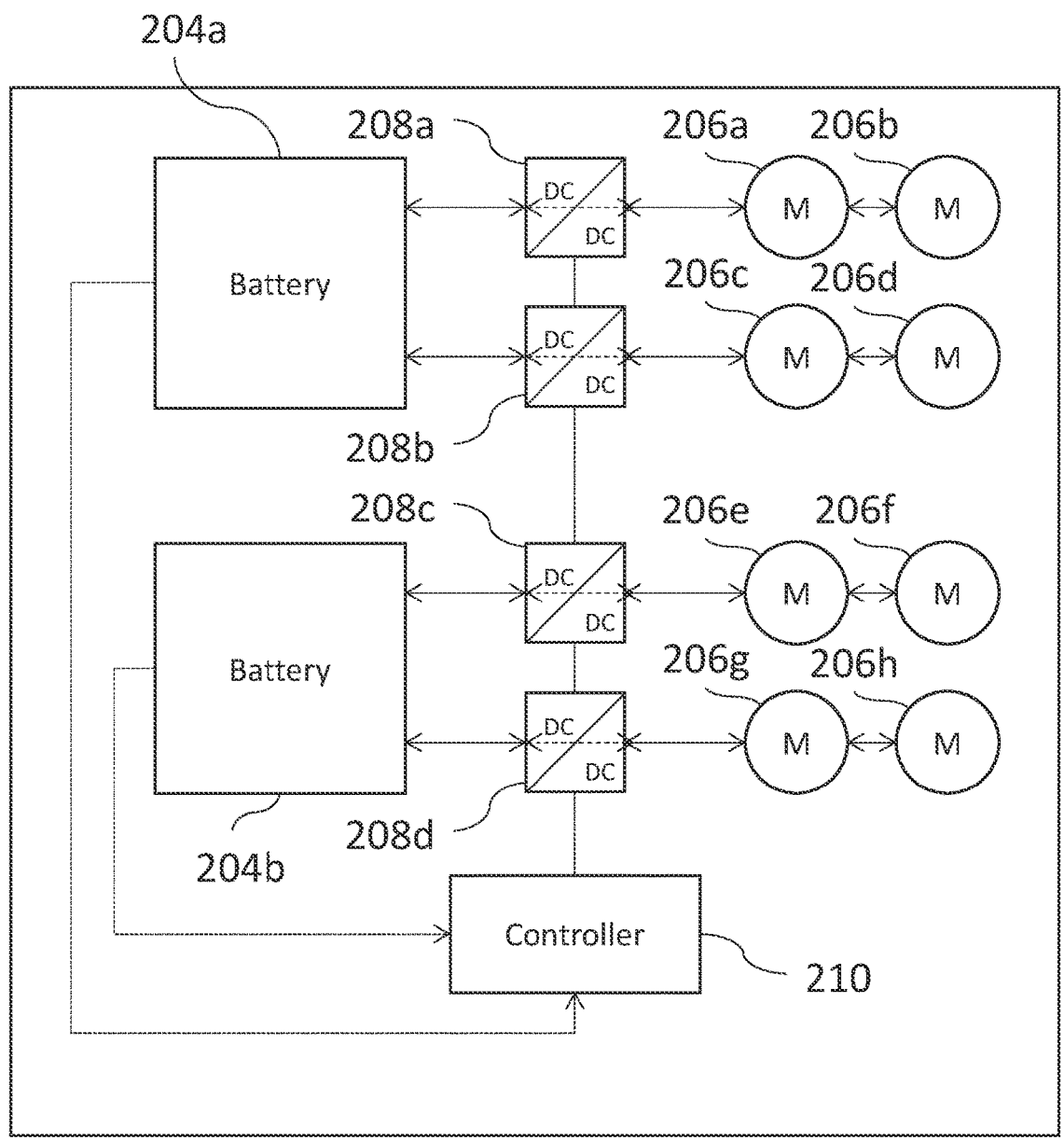
FIG. 3 is a block diagram of a drive system in accordance with an example of the present disclosure.

This system can be seen in further detail in FIG. 3, which is a block diagram of a drive system in accordance with an example of the present disclosure. It can be seen that, in this example, there are a pair of batteries 204a, 204b which are connected to four bidirectional DC-DC converters 208a-d such that the first battery 204a is connected to the first two DC-DC converters 208a, 208b, and the second battery 204b is connected to the other two DC-DC converters 208c, 208d. These DC-DC converters 208a-d drive eight motors 206a-h, where each DC-DC converter 208a-d drives two motors 206a-h, as shown in FIG. 3. It will of course be appreciated that this example is merely illustrative and different numbers of DC-DC converters and/or motors may be used in any suitable topology.

Each bidirectional DC-DC converter 208a-d has a respective first mode of operation in which it generates a regulated output voltage from the input voltage from the respective battery 204a, 204b, and subsequently delivers the regulated output voltage to the motors 206a-h to which it is connected. In their respective second modes of operation, each DC-DC converter 208a-d is by-passed, such that the input voltage from the corresponding battery 204a, 204b is supplied directly to the respective motors 206a-h, as outlined by the dashed lines across the DC-DC converters 208a-d. In its second mode, a DC-DC converter 208a-d is passive, i.e. it simply allows current to pass directly through it from the battery 204a, 204b to the motors 206a-h, and vice versa in its regenerative mode, as outlined below.

The bidirectional DC-DC converters 208a-d also have a third, 'regenerative', mode of operation in which the DC-DC converter 208a-d generates a charging voltage from a load voltage received from the motor 206a-h and supplies said charging voltage to the respective battery 204a, 204b.

The system also includes a controller 210 that is arranged to compare the input voltage supplied by each battery 204*a*, 204*b* to a threshold voltage, where the threshold voltage is less than the nominal battery voltage for each battery 204*a*, 204*b*. In this example, each battery 204*a*, 204*b* has a nominal voltage of 870 Vdc, and the threshold voltage is set to 800 Vdc for each of the DC-DC converters 208*a-d*.

In practice, this 'controller 210' may be a discrete component, but may also form part of one or more of the DC-DC converters 208*a-d*. The controller 210 is shown as an independent functional block for ease of reference and illustration.

The controller 210 is arranged to operate each DC-DC converter 208*a-d* in its first mode when the input voltage of the appropriate battery 204*a*, 204*b* is less than the threshold voltage, i.e. when the voltage from the battery 204*a*, 204*b* drops below 800 Vdc. The controller 210 is also arranged to operate each DC-DC converter 208*a-d* in its respective second mode when the input voltage from the corresponding battery 204*a*, 204*b* is not less than the threshold voltage, i.e. when the battery voltage 204*a*, 204*b* is above 800 Vdc.

Thus the controller 210 acts to keep the voltage supplied to the motors 206*a-h* between 800 Vdc and 870 Vdc (a maximum drop of approximately 8%), a far narrower range than in the prior art drive system where the voltage supplied to the motor could drop as low as 480 Vdc (a maximum drop of approximately 45%).

The controller 210 may also switch one or more of the DC-DC converters 208*a-d* to their respective third mode of operation when regenerative charging of the batteries 204*a*, 204*b* is desired, e.g. during a braking operation when energy may be recovered from any motors 206*a-h* being braked.

As can be seen in the table of FIG. 4, the drive system in accordance with examples of the present disclosure provide a number of benefits when compared to the prior art drive system described above. As can be seen in the table, the motors for both the prior art drive system and the drive system described above in relation to the present disclosure are designed to have the same shaft output power (53.5 kW) and torque (25.6 Nm), however the narrower supply voltage range of the disclosed system provides a number of benefits.

Firstly, the disclosed system provides a much reduced peak phase current of 210 $A_{pk}$, compared to the prior art system which has a peak phase current of 320 $A_{pk}$. The disclosed system also has a reduced worst case DC supply current of 66.9 A at 800 Vdc, whereas the prior art system has a worst case DC supply current of 113.8 A at 470 Vdc.

Due to the reduced current requirements, the minimum cross-sectional area of the supply cable (that supplies current between the motor and batteries) is reduced from 26 mm$^2$ in the prior art system to only 13 mm$^2$ in the disclosed system, thus providing advantageous weight and space savings that may help to offset the additional weight associated with the additional DC-DC converter(s) that aren't present in the prior art system.

This reduced operating voltage range also allows for a more optimised motor design, such that the motor in the disclosed system has a greater motor torque constant of 0.102 Nm/A compared to the prior art torque constant of 0.084 Nm/A.

Figure 5:
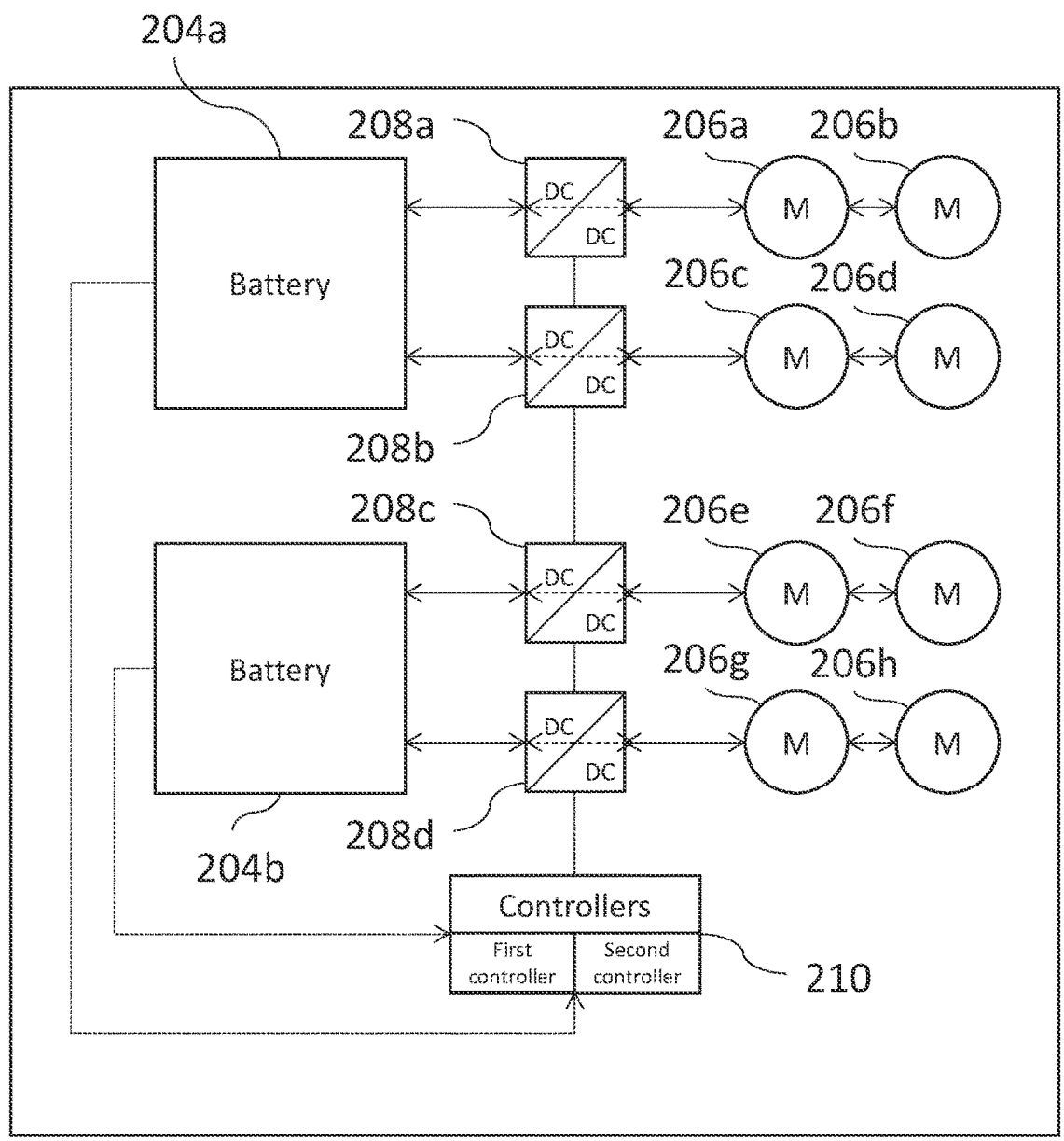
FIG. 5 is the same as FIG. 3, except it shows two controllers.

FIG. 5 is the same as FIG. 3, except it shows a second controller. The drive system may further comprise a second controller arranged to compare the input voltage to a second threshold voltage, said second threshold voltage being less than the nominal battery voltage, wherein the second controller is further arranged to operate the second DC-DC converter in the first mode when the input voltage is less than the second threshold voltage, and to operate the second DC-DC converter in the second mode when the input voltage is not less than the second threshold voltage.

Figure 6:
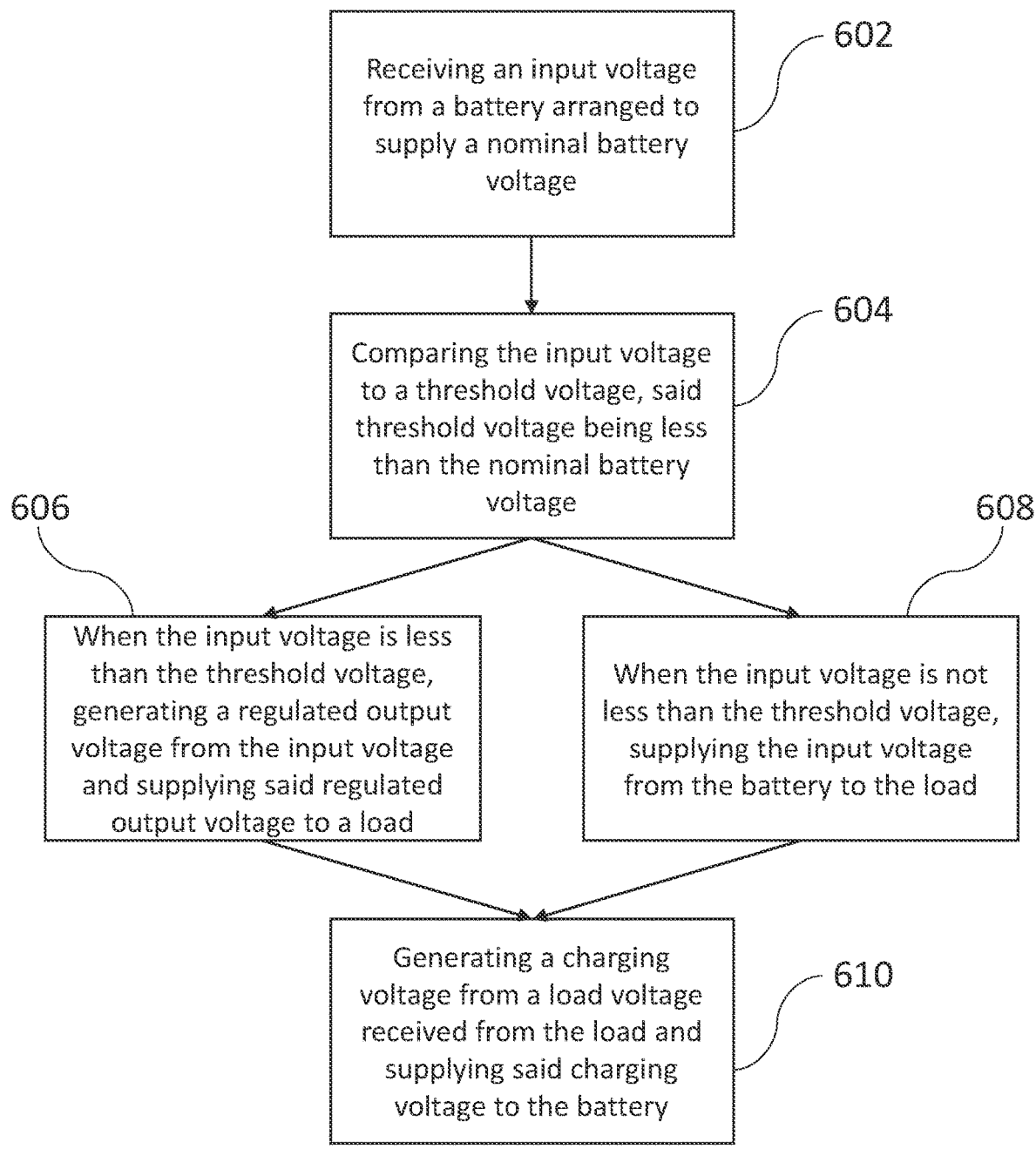
FIG. 6 is a flow chart showing the steps of the method of operating a drive system.

FIG. 6 is a flow chart showing the steps of the method of operating a drive system, Step 602 is receiving an input voltage from a battery arranged to supply a nominal battery voltage. Step 604 is comparing the input voltage to a threshold voltage, said threshold voltage being less than the nominal battery voltage. When the input voltage is less than the threshold voltage, step 606 is generating a regulated output voltage from the input voltage and supplying said regulated output voltage to a load. When the input voltage is not less than the threshold voltage, step 608 is supplying the input voltage from the battery to the load. Step 610 is generating a charging voltage from a load voltage received from the load and supplying said charging voltage to the battery.

Thus examples of the present disclosure provide an improved drive system in which an 'additional' DC-DC converter (that would not otherwise be present in a conventional drive system) is supplied that acts to prevent a voltage derived from a battery dropping below a threshold level before being supplied to a load (e.g. a motor), thereby narrowing the voltage range across which the load must be designed to function. This simplifies the design of the load and also reduces the maximum current that the wiring between the battery and load must be able to carry, thereby allowing for thinner and thus lighter and more space-efficient cable harnessing, which is particularly advantageous to aerospace applications.

While specific examples of the disclosure have been described in detail, it will be appreciated by those skilled in the art that the examples described in detail are not limiting on the scope of the disclosure.

The invention claimed is:

1. A drive system comprising:
a DC-DC converter arranged to receive an input voltage from a battery arranged to supply a nominal battery voltage, said DC-DC converter having a first mode of operation in which the DC-DC converter generates a regulated output voltage from the input voltage and supplies said regulated output voltage to a load, and a second mode of operation in which the DC-DC converter is by-passed such that the input voltage from the battery is supplied to the load; and
a controller arranged to compare the input voltage to a threshold voltage, said threshold voltage being less than the nominal battery voltage, wherein the controller is further arranged to operate the DC-DC converter in the first mode when the input voltage is less than the threshold voltage, and to operate the DC-DC converter in the second mode when the input voltage is not less than the threshold voltage;
wherein the DC-DC converter has a third mode of operation in which the DC-DC converter generates a charging voltage from a load voltage received from the load and supplies said charging voltage to the battery.

2. The drive system as claimed in claim 1 wherein the load is a motor, optionally wherein the motor is coupled to an actuator.

3. The drive system as claimed in claim 1, wherein the nominal voltage of the battery is between approximately 600 V and 1100 V.

4. The drive system as claimed in claim 1, wherein the nominal voltage of the battery is between approximately 700 V and 1000 V.

5. The drive system as claimed in claim 1, wherein the nominal voltage of the battery is between approximately 800 V and 900 V.

6. The drive system as claimed in claim 5, wherein the nominal voltage of the battery is approximately 870 V.

7. The drive system as claimed in claim 1, wherein the threshold voltage is at least approximately 75% of the nominal voltage of the battery.

8. The drive system as claimed in claim 1, wherein the threshold voltage is at least approximately 85% of the nominal voltage of the battery.

9. The drive system as claimed in claim 1, wherein the threshold voltage is at least approximately 90% of the nominal voltage of the battery.

10. The drive system as claimed claim 1, wherein the threshold voltage is approximately 800 V.

11. The drive system as claimed in claim 1, wherein the DC-DC converter is arranged to supply the regulated output voltage to a plurality of loads in the first mode, and to supply the input voltage from the battery to the plurality of loads in the second mode.

12. The drive system as claimed in claim 1, further comprising:
a second DC-DC converter arranged to receive the input voltage from the battery, said second DC-DC converter having a first mode of operation in which the second DC-DC converter generates a regulated output voltage from the input voltage and supplies said regulated output voltage to a second load, and a second mode of operation in which the second DC-DC converter is by-passed such that the input voltage from the battery is supplied to the second load, optionally wherein the second DC-DC converter has a third mode of operation in which the DC-DC converter generates a charging voltage from a load voltage received from the load and supplies said charging voltage to the battery.

13. The drive system as claimed in claim 12, further comprising:
a second controller arranged to compare the input voltage to a second threshold voltage, said second threshold voltage being less than the nominal battery voltage, wherein the second controller is further arranged to operate the second DC-DC converter in the first mode when the input voltage is less than the second threshold voltage, and to operate the second DC-DC converter in the second mode when the input voltage is not less than the second threshold voltage.

14. The drive system as claimed claim 1, wherein the DC-DC converter is arranged to receive a second input voltage from a second battery arranged to supply a second nominal battery voltage, wherein in the first mode of operation, the DC-DC converter generates a regulated output voltage from the first and second input voltages and supplies said regulated output voltage to a load, and wherein in the second mode of operation, the DC-DC converter is by-passed such that the first and second input voltages from the first and second batteries is supplied to the load.

15. A motor drive system comprising:
a motor;
a battery arranged to supply a nominal battery voltage;
a DC-DC converter arranged to receive an input voltage from the battery, said DC-DC converter having a first mode of operation in which the DC-DC converter generates a regulated output voltage from the input voltage and supplies said regulated output voltage to the motor, and a second mode of operation in which the DC-DC converter is by-passed such that the input voltage from the battery is supplied to the motor; and
a controller arranged to compare the input voltage to a threshold voltage, said threshold voltage being less than the nominal battery voltage, wherein the controller is further arranged to operate the DC-DC converter in the first mode when the input voltage is less than the threshold voltage, and to operate the DC-DC converter in the second mode when the input voltage is not less than the threshold voltage;
wherein the DC-DC converter has a third mode of operation in which the DC-DC converter generates a charging voltage from a load voltage received from the load and supplies said charging voltage to the battery.

16. The motor drive system as claimed in claim 15, wherein the DC-DC converter has a third mode of operation in which the DC-DC converter generates a charging voltage from a load voltage received from the motor and supplies said charging voltage to the battery.

17. A method of operating a drive system, the method comprising:
receiving an input voltage from a battery arranged to supply a nominal battery voltage;
comparing the input voltage to a threshold voltage, said threshold voltage being less than the nominal battery voltage;
when the input voltage is less than the threshold voltage, generating a regulated output voltage from the input voltage and supplying said regulated output voltage to a load; and
when the input voltage is not less than the threshold voltage, supplying the input voltage from the battery to the load; and
generating a charging voltage from a load voltage received from the load and supplying said charging voltage to the battery.

* * * * *